April 19, 1932. F. TURRETTINI 1,854,634
MEASURING DEVICE FOR MACHINE TOOLS
Filed June 13, 1929 2 Sheets-Sheet 1
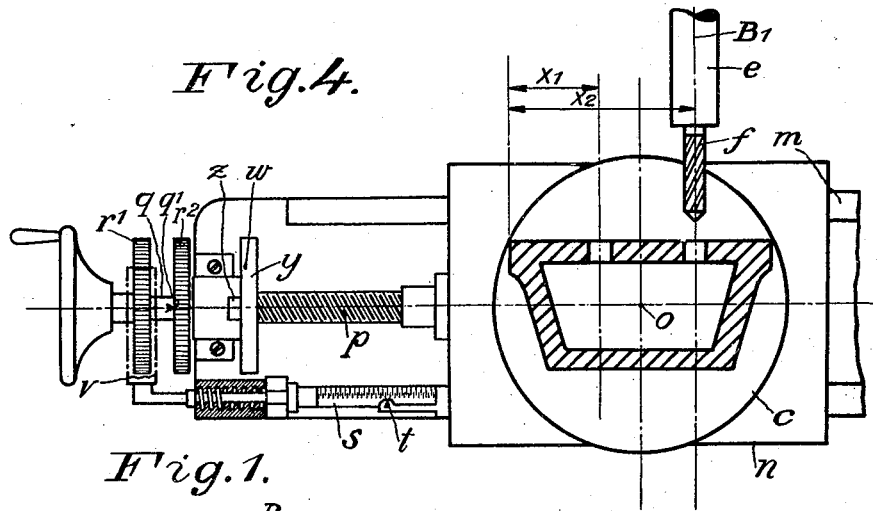
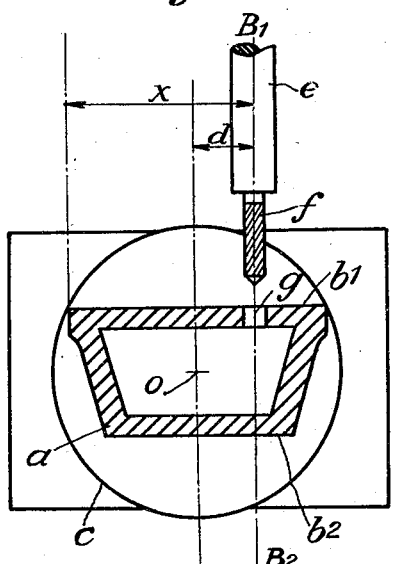
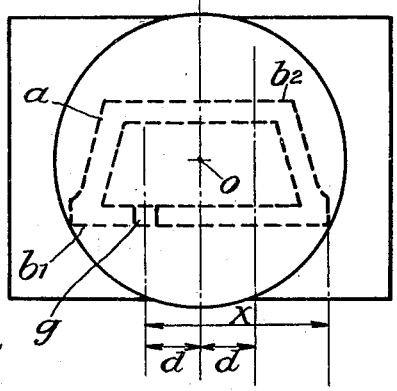
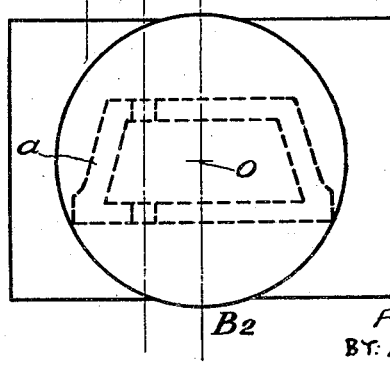
INVENTOR:
Fernand Turrettini
BY: Rugg, Boyst Bakewell
ATTORNEYS April 19, 1932.  F. TURRETTINI  1,854,634
MEASURING DEVICE FOR MACHINE TOOLS
Filed June 13, 1929  2 Sheets-Sheet 2
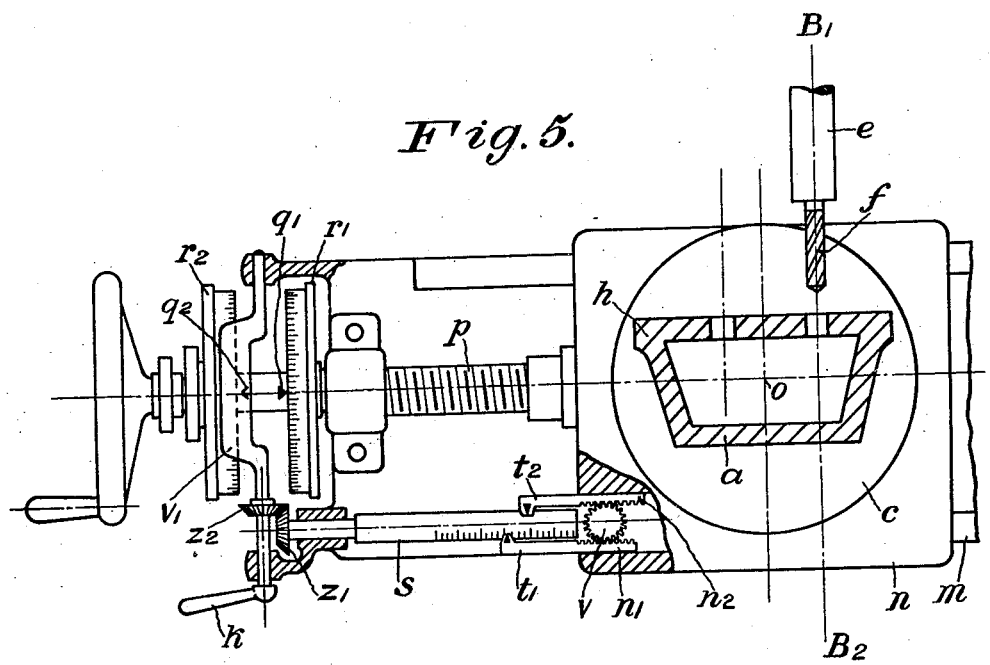
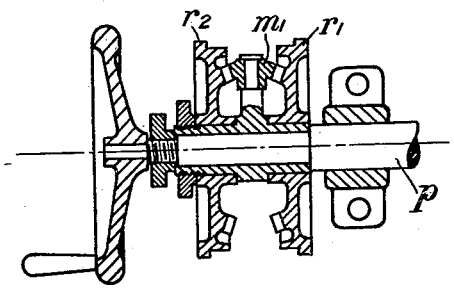
INVENTOR:
Fernand Turrettini
BY: Pugh, Bayer+Bakelar
ATTORNEYS Patented Apr. 19, 1932

1,854,634

UNITED STATES PATENT OFFICE

FERNAND TURRETTINI, OF GENEVA, SWITZERLAND, ASSIGNOR TO SOCIETE GENEVOISE D'INSTRUMENTS DE PHYSIQUE, OF GENEVA, SWITZERLAND, A CORPORATION OF SWITZERLAND

MEASURING DEVICE FOR MACHINE TOOLS

Application filed June 13, 1929, Serial No. 370,480, and in Germany July 23, 1928.

This invention relates to a measuring device for machine tools for the machining of opposite faces of the work.

It is often found that the dimensions of the work in which for instance drilling is to be effected with great accuracy on two or more surfaces situated opposite one another, are so great that it is not possible to drill the work in a single operation with a drilling tool sufficiently long to pass through from one side to the other opposite side. The flexibility of an excessively long tool and its insecure guiding, which affect the accuracy of the work must be taken into account.

It may also happen that the holes which are to be provided at one side of the work are not concentric with those which are to be provided at the opposite side.

In both the cases above referred to, one surface must first be drilled, then the work turned on the machine exactly half a revolution and finally the opposite face of the work must be drilled.

The coordinates of the axes of the holes to be drilled in the two faces are of course determined beforehand, but owing to the turning of the work and to the various movements or adjustments required during the turning for the setting of the same, are very difficult to obtain with a sufficient accuracy; the exact point of origin of the coordinates is lost when passing from one face of the work to the other opposite face to be machined.

Figure 1 is a diagrammatic plan view of the work support and tool;

Figures 2 and 3 are plan views similar to Fig. 1 showing successive positions of the work table;

Figure 4 is a plan view of the machine embodying one form of measuring device;

Figure 5 shows a modified form of measuring device; and

Figure 6 shows a detail of the measuring device disclosed in Fig. 5.

For the purpose of explaining the principle of the invention, it will be assumed that a hollow body $a$ (Figures 2 and 3) of lozenge shaped cross section is to be machined. This cross section has been chosen merely for the purpose of facilitating the understanding of the drawings as regard the turning of the work. The work $a$ could for instance be fixed on a revolving table of a horizontal drilling machine. Let it be assumed that on the surface $b^1$ is to be drilled a hole, at a distance $x$ from a corner which forms the origin of the coordinates. The work is secured to the revolving table $c$, the centre of rotation of which is marked $o$.

Assuming now that a hole $g$ is drilled in the surface $b^1$ by means of a spindle $e$ of the drilling machine, provided with a suitable tool $f$, and that it is then necessary to drill afterwards on the surface $b^2$ of the work $a$ a hole concentric with the hole $g$ it will follow that the distance $d$ which separates the axis of rotation $o$ of the revolving table $c$ from the axis of the drilling spindle which moves in the direction $B^1$—$B^2$, cannot be known with absolute certainty in any conditions, unless special means be provided for this purpose.

In Figure 2, may be seen the work $a$ turned to 180° about the centre $o$, the hole $g$ is now on the opposite side of the tool $f$ and is at a distance $2d$ from the axis $B^1$—$B^2$ in which the tool $f$ advances.

In order to bring the drilled hole $g$ into this axis, it is necessary as will be seen from Figure 3, to move the work $a$ to the right, to the extent $2d$, by correspondingly moving the carriage $n$ on which rests the revolving table $c$.

This movement, the value of which is very difficult to determine with the means hitherto known, can be effected with great accuracy with the assistance of the measuring device according to the invention.

This device can be used in machine tools intended for the machining, for instance milling or drilling, of opposite faces of the work, and have a platform for receiving the latter, which can be turned in such a manner that the opposite faces of the work are brought in front of the tool, means being provided at the same time for imparting to the platform and to the work an exactly predetermined movement under the action of a measuring screw.

The measuring device according to the invention is characterized (a) by two equal divisions or scales provided with numbers, the numbers of one division going however in the opposite direction to those of the other division, and the divisions being situated on one or two reading drums of the measuring screw, which make it possible to read fractions of the measuring unit given (millimeter, inch, etc.); (b) by two equal linear divisions which are intended for reading whole measuring units, the numerical values of which run however in opposite direction to one another, and indicate the position of the carriage $n$, (c) by an arrangement for determining the position of the platform in which the axis of rotation of the latter intersects the axis of rotation of the tool, in such a manner that from this position it is possible to determine exactly the position of the places to be machined in accordance with the coordinates of the same, whichever of the two positions be occupied by the platform.

Figure 4 of the accompanying drawings shows diagrammatically by way of example a construction of the measuring device according to the invention.

The machine tool in which this construction of the measuring apparatus is used, has rectilinear guide tracks along which can move a carriage $n$ under the action of a measuring screw $p$. On the carriage $n$ is mounted a table $c$ on which the work $a$ can be secured and which can rotate about its axis $o$ under the action of any mechanism (not shown in the drawings).

The axis $B^1$—$B^2$ of the tool $f$ for the drilling of holes is adjustable only in a vertical plane.

The measuring screw $p$ carries two reading drums $r^1$, $r^2$ provided with divisions of the same kind, the numerical values of which read in the opposite direction, they are adjustable relatively to two pointers $q$ $q^1$. The drums are mounted by friction of the spindle of the measuring screw $p$ in such a manner that their angular setting on the latter can be varied at will and locked. By means of these two reading drums $r^1$, $r^2$ can be read fractions of the measuring unit, for instance hundredths of a millimeter.

The number of whole units which correspond to the position of the carriage $n$, can be determined at any moment by means of a subdivided rod $s$ and of the pointer $t$ which is rigidly secured to the carriage $n$. The measuring rod has two identical divisions, but the numeral values of one, read in the opposite direction to those of the other division. The divisions are provided on two faces of the measuring rod $s$. The latter can turn about its longitudinal axis so that either one or the other of its divisions is brought opposite the pointer $t$.

One of the reading drums may be completely covered up by means of a movable screen $v$ which is mechanically connected to the measuring rod $s$ so that the visible reading drum $r^1$ or $r^2$ is that one in which the direction of increase in the numbers agrees with that of the visible division of the measuring rod $s$.

The arrangement for the determination of the position of the carriage $n$, in which the axis $B^1$—$B^2$ of the tool $f$ intersects the axis $o$ of the table $c$ is provided with a visible mark $w$ which is provided on a third drum $y$ and with a setting mark on a fixed part $z$.

When it is desired to drill concentric holes in opposite faces of a piece of work, the described construction is used in the following manner:

The operator who follows only the numbers and division strokes which can be read on one of the reading drums $r^1$ or $r^2$ and on the corresponding division or scale of the rod $s$ moves the carriage $n$ by means of the measuring screw $p$ into the position which is determined by the coordinates $x^1$, $x^2$ etc. and adapted for the drilling of the holes on one of the two opposite faces to be drilled. After the holes have been drilled, the carriage $n$ is brought to the position of the point of intersection of the axes $o$ and $B^1$—$B^2$, which can be ascertained by means of the above mentioned pointer indicating the coincidence.

Assuming that up to that moment the reading drum $r^1$ and the corresponding division of the measuring rod $s$ has been used, the reading drum $r^2$ (which is frictionally mounted on the measuring screw $p$) will now be set in such a manner that it will give the same reading as the reading drum $r^1$ when the coincidence pointer shows that the axes $o$ and $B^1$—$B^2$ intersect. The measuring rod $s$ is then turned so that the division which corresponds to the reading drum $r^2$ will become visible. This movement automatically covers up the other division of the measuring rod $s$, as well as the reading drum $r^1$.

It must be pointed out that as the position of the point of intersection of the axes $o$ and $B^1$—$B^2$ is necessarily situated in the central position of the carriage $n$, the agreement of the readings on the two divisions of the measuring rod $s$, which are taken in this position, will of course be given by the symmetry of their reverse numbers with reference to this position.

When using afterwards the reading drum $r^2$, the operator will bring the carriage $n$ into the position determined by the coordinates of the holes, and necessarily drill concentric holes which have the coordinates of the same numerical value for each concentric hole in the above described measuring system.

The two scales which give the linear position of the table $c$, are not necessarily provided on one and the same measuring rod and also need not necessarily be read with the assistance of the same pointer; on the contrary, they could be provided on different measuring rods and each have a pointer of their own. They could be combined with an optical or mechanical system for magnifying the movements of the carriage.

The means which are used for covering up one or the other division or graduation of the measuring rod, and the division or graduation of the corresponding drum, are in themselves merely an auxiliary safety device for avoiding errors; they could also be omitted in certain cases.

The arrangement which is used for determining the position in which the axis $B^1$—$B^2$ of the tool intersects the axis of rotation $o$ of the revolving table $c$, could also be provided with a movable mark rigidly secured to the carriage $n$ and moving in front of a fixed mark secured to the machine bed, with or without an optical or mechanical system for magnifying the movements of the carriage.

The machine tool on which the measuring device is used, could also be provided with a table which can make rotary movements but no rectilinear movements. In such a case, it will be the tool which under the action of a measuring screw will be moved in a straight line relatively to the table, in order to determine the points at which the holes are to be drilled in the opposite faces of the work.

Although in the preceding the measuring device has been described only in its application to the drilling of holes, it could be of course used in any other kind of machining, such as milling etc. of a piece of work on two opposite faces.

Figures 5 and 6 show another construction of measuring device, the principle of working of which is the same as that of the construction of measuring device described, but which has a more perfect mechanism.

This construction has for its object to simplify the use of the measuring device by the operator and more particularly to enable him to choose as the origin of the coordinates for his subsequent work, a round number of units of length. As the origin, is always chosen an easily determined point on the work to be machined, for instance a material point such as a machined edge or the centre of an existing hole.

To that end, this measuring device is provided with a measuring screw $p$ on which are mounted the two reading drums $r^1$, $r^2$ which have an identical division or graduation but so that the numerical values of one drum increase in the opposite direction to the numerical values of the other drum. These two reading drums $r^1$, $r^2$ are mounted on the measuring screw $p$ with a slight amount of friction, and are both provided with teeth with which engages a toothed pinion $m^1$, thus coupling them together. This spindle of the toothed pinion $m^1$ is rigidly secured to the measuring screw. When therefore for a regulation one of the two reading drums $r^1$ or $r^2$ is turned relatively to the measuring screw $p$, the other measuring drum $r^2$ or $r^1$ will be turned to the same angle, but in the opposite direction. As the numerical values of the two reading drums $r^1$, $r^2$ also increase in opposite directions, it follows that whichever be the turning relatively to the measuring screw $p$ assumed to be fixed, always the same division strokes and numerical values will appear in both drums opposite their pointers $q^1$ and $q^2$.

The first setting of the reading drums $r^1$ and $r^2$ is effected in such a manner that when the axis $B^1$—$B^2$ along which the tool $f$ is moving, intersects the centre of rotation $o$, the zeros of the reading drums $r^1$, $r^2$ will be simultaneously opposite their corresponding pointers $q^1$, $q^2$.

A similar arrangement is provided also for the pointer of the measuring rod $s$ which is used for the reading of whole units of length which determine the position of the carriage $n$ relatively to the fixed frame $m$ of the machine.

The measuring rod $s$ is provided in its two different lateral surfaces with identical divisions, but in such a manner that the numerical values of one side increase in the opposite direction to those of the other side, the mean numerical value of the two pointers $t^1$, $t^2$ agreeing when the axis $o$ intersects the axis $B^1$—$B^2$.

The two pointers $t^1$, $t^2$ are adjustable in such a manner that they can be moved along the divisions of the measuring rod $s$, without the carriage $n$ being moved. The pointers $t^1$, $t^2$ may also be locked in a chosen regulating position or clamped fast, in a manner not shown in the drawings.

Each of the two pointers $t^1$, $t^2$ is connected to a toothed rack $n^1$ and $n^2$ respectively, which racks are in engagement with a toothed pinion $v$, the spindle of rotation of which is rigidly secured to the carriage $n$.

When for the purpose of a regulation the pointer $t^1$ for instance is moved to a given value in one direction, the pointer $t^2$ will be moved to the same value but in the opposite direction.

If for instance the carriage $n$ is brought to a position in which the axis $o$ intersects the axis $B^1$—$B^2$ the two pointers $t^1$, $t^2$ will give on the division and on the numerical values increasing in the opposite direction, of the measuring rod $s$, the same reading whatever be the adjustment movements to which they have been subjected first. This condition applies when the necessary attention has been paid in the manufacture to the fact that in the central position (point of intersection of $o$ and $B^1$—$B^2$) the two pointers $t^1$, $t^2$ must be simultaneously opposite the stroke and mean value of the two divisions and of the numerical values increasing in opposite directions, with which the measuring rod $s$ is provided.

The measuring rod $s$ is provided at its end with a bevel pinion $z^1$ which is in engagement with another pinion $z^2$ which is rigidly secured to the screening member $v^1$ which on turning about the axis of the pinion $z^2$, can cover up one or the other of the reading drums $r^1$, $r^2$.

A crank $k$ allows of a simultaneous rotation of the screen $v^1$ and of the measuring rod $s$ in such a manner that only the division strokes and numerical values will be visible which agree with each other.

When using the measuring device, the operator can set for instance the pointer $q^1$ and the pointer $t^1$ in such a manner that they will give the reading of whole units of length when the corner $h$ of the work $a$ is in the axis $B^1$—$B^2$. When he turns subsequently the work $a$ to half a revolution in order to machine the opposite face, and operates the crank $k$ in order to uncover the division strokes and the previously covered pointers of the measuring screw $p$ or of the measuring rod $s$, he need only bring the carriage $n$ into such a position that the pointers $t^2$ and $q^2$ shall indicate the same numerical values as before, in order to make sure that the corner $h$ is again in the line $B^1$—$B^2$ as before the turning of the work piece $a$.

What I claim is:

1. In a machine of the character described, the combination of a rotatable and axially movable tool, a work support mounted for displacement across the axis of the tool, said work-support being rotatable thereby alternately to present the outer faces of opposite separated walls of the work for operation by the tool, means for displacing said work-support, a member mounted for rotation and carrying a pair of graduated scales at opposite sides thereof, index means carried by the work support and cooperating with said scales respectively for indicating the position of the axis of the work-support with relation to that of the tool, the graduations of said scales being such that the same reading on the respective scales will indicate alinement with the tool of a predetermined point on a wall of the work respectively when said wall is facing the tool and after the work-support has been rotated and displaced to carry said wall to the side remote from said tool and said point into realinement with the tool, graduated drums secured to said displacement means and cooperating with index members for indicating fractions of the graduations of the respective scales, movable means for alternately concealing the graduations of the respective drums, and means for rotating said scale-carrying member thereby to alternately expose the respective scales and simultaneously operative to move said concealing means thereby to expose the graduations of the drum corresponding with the exposed scale.

2. In a machine of the character described, the combination of a rotatable and axially movable tool, a work support mounted for displacement across the axis of the tool, said work-support being rotatable thereby alternately to present the outer faces of opposite separated walls of the work for operation by the tool, means for displacing said work-support, a member mounted for rotation and carrying a pair of graduated scales at opposite sides thereof, index means carried by the work support and cooperating with said scales respectively for indicating the position of the axis of the work-support with relation to that of the tool, the graduations of said scales being such that the same reading on the respective scales will indicate alinement with the tool of a predetermined point on a wall of the work respectively when said wall is facing the tool and after the work-support has been rotated and displaced to carry said wall to the side remote from said tool and said point into realinement with the tool, graduated drums secured to said displacement means and cooperating with index members for indicating fractions of the graduations of the respective scales, movable means for alternately concealing the graduations of the respective drums and means for rotating said scale-carrying member thereby to alternately expose the respective scales and simultaneously operative to move said concealing means thereby to expose the graduations of the drum corresponding with the exposed scale, the two index members of the scales being displaceable automatically an equal distance in opposite directions along the respective scales with respect to the work-support and the two graduated drums being rotatable automatically an equal distance in opposite directions with respect to said displacement means, thereby to indicate a predetermined numerical reading for a given position of the displaceable work-support.

In testimony whereof I have affixed my signature.

FERNAND TURRETTINI.